Patented June 13, 1939

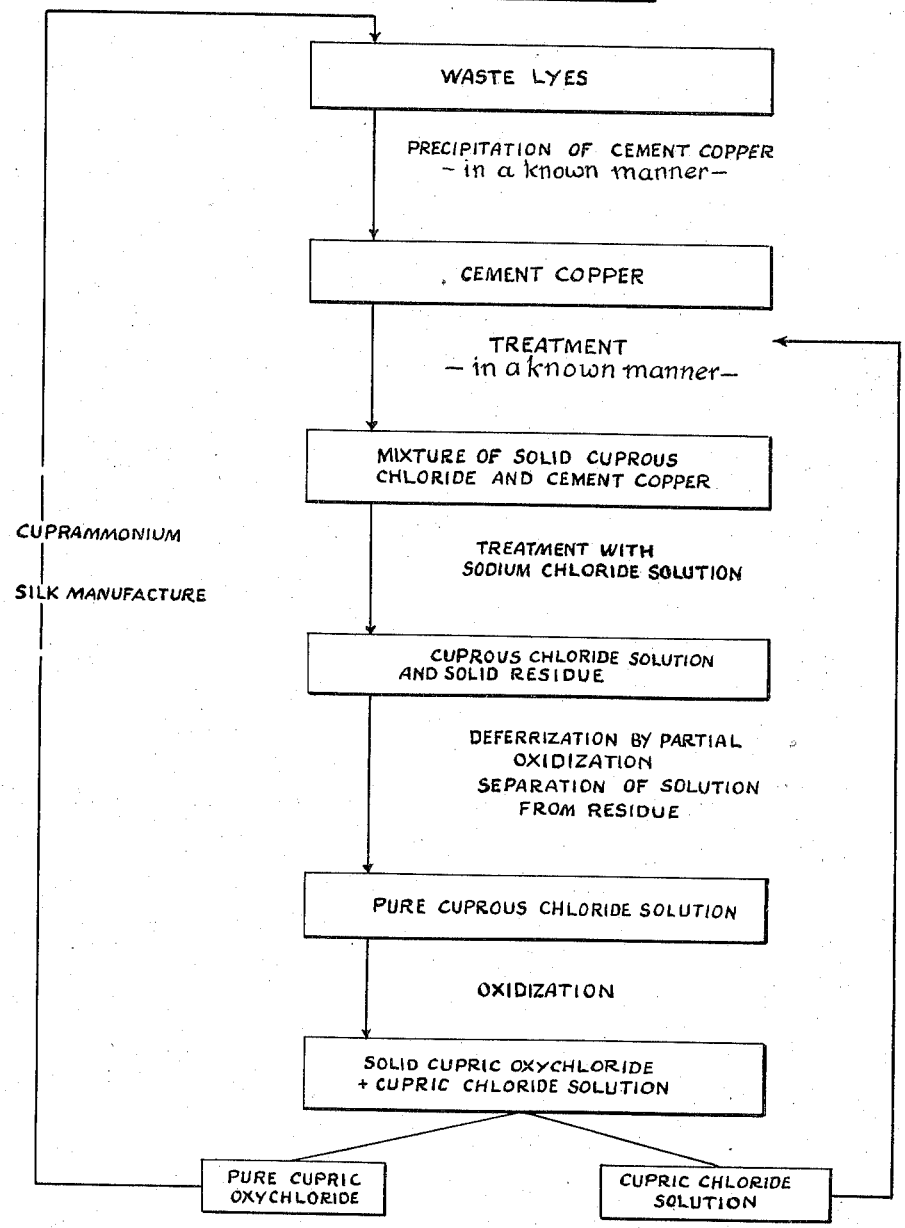

2,162,176

UNITED STATES PATENT OFFICE 2,162,176

REGENERATION OF COPPER FROM CUPRAMMONIUM ARTIFICIAL SILK WASTE LYES

Ernst Kuss, Oskar Emert, and Andreas Hake, Duisburg, Germany, assignors of one-half to Duisburger Kupferhuette, Duisburg, Germany, and one-half to I. G. Farbenindustrie Aktiengesellschaft, Frankfort-on-the-Main, Germany Application February 11, 1937, Serial No. 125,348
In Germany October 13, 1934

10 Claims. (Cl. 23—85)

This invention relates to a cycle process for regenerating copper contained in the waste lyes of the cuprammonium artificial silk production.

The copper used in the manufacture of cuprammonium silk is regenerated in a cycle process as completely as possible. Basic copper sulfate (together with ammonia, water and cellulose) is used for preparing the spinning solution. In the spinning process the copper is transferred from the spinning solution in part into very dilute ammoniacal, in part into more concentrated sulfuric acid solutions. From these solutions cement copper is directly or indirectly separated in a known manner and the cement copper dissolved in sulfuric acid to copper sulfate. By precipitation with nitrites the solution obtained in this manner is freed from iron and subsequently treated with soda for the precipitation of the copper as basic copper sulfate. The basic copper sulfate is again used for the manufacture of the spinning solution. Therewith the copper cycle process is complete.

In other processes the copper is separated from the ammoniacal dilute solutions with iron sulfate as double salt and recovered by decomposition of the said salt in the form of copper sulfate solutions. From the sulfuric acid solutions likewise a copper sulfate solution is obtained. Both solutions finally are used after deferrization in the manufacture of basic copper sulfate by precipitation with soda.

No matter which of the customary methods is employed they all lead to the same result, viz. that basic copper sulfate is obtained over the copper sulfate, the former being used for batches for spinning solutions.

Further processes are described in the literature, for instance, the manufacture of the spinning solution with the use of cement copper, ammonia and air. However, these processes have not attained any practical importance.

In accordance with the present invention the new copper regeneration cycle process is carried out in such a manner that the copper of the ammoniacal dilute solutions and the copper of the sulfuric acid solutions is separated in a known manner as cement copper, transforming the latter into a cuprous chloride-cement copper-mixture according to a process known per se containing the copper to about equal parts as cuprous chloride and cement copper, dissolving the cuprous chloride in sodium chloride solution with partial selective oxidation for deferrization, oxidizing the separated cuprous chloride-sodium chloride-solution with air and using the separated and washed cupric oxychloride for the batch of the spinning solution together with cellulose, ammonia and water. The cupric chloride formed is advantageously introduced into the cycle process for treatment of the cement copper.

The process above specified shows many advantages. The reactions, in particular the oxidation with air, proceed rapidly. The cupric oxychloride obtained in this manner is very pure. The separate iron precipitation process and the precipitating agent, soda, used in the known processes are saved in the new process.

The copper from the dilute ammoniacal solutions and the copper of the sulfuric acid solutions rich in copper (in the following both called waste lyes) are transformed in the usual manner into cement copper.

For instance, the copper of the ammoniacal solutions may be separated by the addition of lime as copper hydroxide; the copper hydroxide may be dissolved in the sulfuric acid solution and the copper may be cemented with iron from the copper sulfate solution obtained after filtration from gypsum.

The cement copper obtained is transformed into a cuprous chloride-cement copper-mixture in the usual manner.

Advantageously cupric chloride solutions may be used therefore which can be prepared in such a manner that part of the sulfuric acid waste lye is treated with sodium chloride; but also a suspension of cement copper may be treated with chlorine. In this manner cupric chloride is formed intermediary which reacts with excess cement copper with the formation of cuprous chloride. It is also possible to dissolve part of the cupric oxychloride obtained in a later step in hydrochloric acid and to use the cupric chloride solution formed in the manufacture of the cuprous chloride-cement copper-mixture. Whether the chlorine ions are added in the form of chlorides, hydrochloric acid or chlorine depends on the material at hand in the respective case. However, it is essential that a cuprous chloride-cement copper-mixture is obtained in which upon about one mol of cuprous chloride one atom of metallic copper is calculated.

It is advantageous in the dissolving process of the cuprous chloride-cement copper-mixture that a partial oxidation takes place simultaneously. Almost in all cases the cuprous chloride-cement copper-mixture contains small traces of iron which in the said manner can be removed by selective oxidation. If in the working up processes to cement copper for instance sulfuric acid is used which contains arsenic, there is a possibility that besides iron also arsenic is present in the cuprous chloride-cement copper-mixture. In that case it is advantageous to add iron salts to the cuprous chloride solution, for instance, in the form of iron sulfate, to be able to precipitate all arsenic with iron in the partial oxidation. Cupric oxychloride precipitates first after the iron precipitation is practically complete. It is also possible to add the cupric oxychloride of a former manufacture to the partial oxidation which in the presence of cement copper reacts according to the following equation:

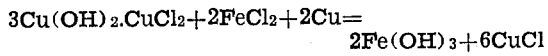
$$3Cu(OH)_2 \cdot CuCl_2 + 2FeCl_2 + 2Cu = 2Fe(OH)_3 + 6CuCl$$

Therefore it is advantageous to prepare the cuprous chloride-cement copper-mixture with an excess of cement copper. In this manner the purification process is simultaneously connected with the dissolving process, in particular the purification from iron and arsenic.

The solution which is filtered off from the residue is oxidized with air or other oxygen-containing gases. In this manner in accordance with the following equation

$$6CuCl + 3O + 3H_2O = 3Cu(OH)_2 \cdot CuCl_2 + 2CuCl_2$$

cupric oxychloride and cupric chloride are formed. The cupric oxychloride obtained is separated from the solution containing cupric chloride and washed. It is very pure.

The cupric oxychloride is used for the batch of the spinning solution together with cellulose, ammonia and water. The process can be carried out in the same manner as in the case of the use of basic copper sulfate.

The cupric chloride-containing sodium chloride solution is used for the manufacture of fresh cuprous chloride solution from the cuprous chloride-cement copper-mixture in a cycle process. Thereby the cupric chloride is again transformed into cuprous chloride by means of cement copper. That is to say the dissolving process is simultaneously a regeneration process.

The above-described process is illustrated in the flow sheet constituting the single figure of the drawing.

The invention is further illustrated by the following examples without being restricted thereto:

*Example 1.*—A spinning solution containing in a batch 6.7 tons of metric copper in form of cupric oxychloride is spun. In this manner 30,000 cbm. of a dilute ammoniacal waste lye containing 100 mgs. of Cu per liter and 300 cbm. of sulfuric acid solution with about 10 grams of Cu per liter are obtained. From the 30,000 cbm. of dilute ammoniacal solution about 70% of the copper are separated by means of lime and separated from the remaining solution with decanting. The copper hydroxide sludge is dissolved in 300 cbm. of the sulfuric acid waste lye. The solution obtained in this manner is treated with scrap iron. About 5 metric tons of the cement copper obtained in this manner are suspended in 50 cbm. of a sodium chloride solution with 160 grams of NaCl per liter and treated with about 1.3 metric tons of chlorine. A cuprous chloride solution containing cement copper and undissolved cuprous chloride is obtained which is contaminated with iron compounds. The cuprous chloride-cement copper-mixture is mixed in a vessel provided with a mechanical stirrer at 70° C. while stirring and blowing air through the solution. After a short time the solution is separated from the residue by filtration and after heating to 75° C. pumped into a vessel with a mechanical stirrer over nozzles with a pump until the reaction is complete. The cupric oxychloride formed is separated from the cupric chloride solution by filtration, the cupric oxychloride which has been filtered off is suspended in a hot 10% sodium chloride solution and filtered with suction over a rotary filter, whereby it is simultaneously washed with hot water. About 2.8 metric tons of cupric oxychloride are obtained in this manner. The product is very pure. It contains less than 0.02% of iron. The cupric chloride solution containing NaCl obtained in the oxidation process is reintroduced into the stirring apparatus containing the remainder of the cuprous chloride-cement copper-mixture. The cupric chloride is used in the manufacture of a new cuprous chloride solution. The cupric oxychloride obtained is used in the manufacture of a new spinning solution.

*Example 2.*—The sulfuric acid waste lye obtained in cuprammonium artificial silk production which contains about 10 grams of Cu per liter is divided into two parts in such a manner that about 70% form the one, and 30% form the other part. The first part is treated with such a quantity of common salt that 18–20 grams of NaCl per liter are present in the solution. The second part is used for dissolving the cupric hydroxide which is obtained from the dilute ammoniacal waste lyes by precipitation with lime. The copper of the solution is cemented with scrap iron. The cement copper thus obtained is added to the first part (70%) of the sulfuric acid waste lye. A further quantity of cement copper is added so that the loss of copper during the cuprammonium silk process is covered. The cuprous chloride-cement copper-mixture is separated and mixed with an aqueous sodium chloride solution with the addition of cupric oxychloride of a former batch, while stirring. The cuprous chloride solution formed is filtered with suction from the residue containing iron, oxidized with air for obtaining pure cupric oxychloride as indicated in Example 1. The cupric oxychloride is again used for the batch of the spinning solution.

*Example 3.*—The process is carried out as indicated in Example 1. The copper is separated from the dilute waste lyes as cement copper. The 5 metric tons of cement copper obtained— provided 25% of copper are lost in the technical process—are treated with 8 cbm. of a cupric chloride solution containing 430 grams of $CuCl_2$ per liter. A cuprous chloride-cement copper-mixture is obtained which is separated from the solution. The cuprous chloride-cement copper-mixture is further worked up to cupric oxychloride as indicated in Example 1, and introduced into the spinning solution.

This is a continuation in part of our copending application for Letters Patent Serial No. 43,604, filed October 4, 1935.

We claim:

1. In the process of regenerating copper from the waste lyes obtained from spinning solutions in cuprammonium artificial silk production, the steps which comprise precipitating the copper contained in such waste lye in the form of cement copper, transforming the cement copper into a mixture of cuprous chloride and cement and cement copper with sodium chloride solution whereby to dissolve cuprous chloride, separating the resulting cuprous chloride solution from undissolved residue, oxidizing the so separated solution of substantially pure cuprous chloride with air, and separating and washing the so precipitated substantially chemically pure cupric oxychloride which is specially adapted for direct use in making cuprammonium cellulose solution for spinning purposes.

2. In the process of regenerating copper from the waste lyes obtained from spinning solutions in cuprammonium artificial silk production, the steps which comprise precipitating the copper contained in such waste lye in the form of cement copper, transforming the cement copper into a mixture of cuprous chloride and cement copper in which upon about one mol of cuprous chloride one atom of metallic copper is calculated, treating the mixture of cuprous chloride and cement copper with sodium chloride solution whereby to dissolve cuprous chloride, separating the resulting cuprous chloride solution from undissolved residue, oxidizing the so separated solution of substantially pure cuprous chloride with air, and separating and washing the so precipitated substantially chemically pure cupric oxychloride which is specially adapted for direct use in making cuprammonium cellulose solution for spinning purposes.

3. In the process of regenerating copper from the waste lyes obtained from spinning solutions in cuprammonium artificial silk production, the steps which comprise precipitating the copper contained in such waste lye in the form of cement copper, transforming the cement copper into a mixture of cuprous chloride and cement copper, treating the mixture of cuprous chloride and cement copper with sodium chloride solution whereby to dissolve cuprous chloride, subjecting the resulting mixture to partial selective oxidation for deferrization, separating the resulting cuprous chloride solution from undissolved residue, oxidizing the so separated solution of substantially pure cuprous chloride with air, and separating and washing the so precipitated substantially chemically pure cupric oxychloride which is specially adapted for direct use in making cuprammonium cellulose solution for spinning purposes.

4. The process defined in claim 3, in which the partial selective oxidation for deferrization is effected by means of air.

5. The process defined in claim 3, in which the partial selective oxidation for deferrization is effected by means of cupric oxychloride.

6. In the process of regenerating copper from the waste lyes obtained from spinning solutions in cuprammonium artificial silk production, the steps which comprise precipitating the copper contained in such waste lye in the form of cement copper, transforming the cement copper into a mixture of cuprous chloride and cement copper in which the copper contained in the cement copper is in excess of the copper contained in the cuprous chloride, treating the mixture of cuprous chloride and cement copper with sodium chloride, treating the mixture of cuprous chloride solution whereby to dissolve cuprous chloride, adding an iron salt for simultaneous precipitation of arsenic and subjecting the resulting mixture to partial selective oxidation for elimination of arsenic and iron, separating the resulting cuprous chloride solution from undissolved residue, oxidizing the so separated solution of substantially pure cuprous chloride with air, and separating and washing the so precipitated substantially chemically pure cupric oxychloride which is specially adapted for direct use in making cuprammonium cellulose solution for spinning purposes.

7. The process defined in claim 6, in which the partial selective oxidation for deferrization is effected by means of air.

8. The process defined in claim 6, in which the partial selective oxidation for deferrization is effected by means of cupric oxychloride.

9. In the process of regenerating copper from the waste lyes obtained from spinning solutions in cuprammonium artificial silk production, the steps which comprise precipitating the copper contained in such waste lye in the form of cement copper, transforming the cement copper into a mixture of cuprous chloride and cement copper, treating the mixture of cuprous chloride and cement copper with sodium chloride solution whereby to dissolve cuprous chloride, separating the resulting cuprous chloride solution from undissolved residue, oxidizing the so separated solution of substantially pure cuprous chloride with air whereby there is produced a solution of cupric chloride and a precipitate of substantially chemically pure cupric oxychloride, separating the precipitate from the solution and washing the former, reacting the cupric chloride solution with a further quantity of cement copper to the production of additional cuprous chloride, and converting the latter into cupric oxychloride as hereinbefore described.

10. The cyclic process for converting impure cement copper derived from waste lye from cuprammonium silk manufacture into substantially chemically pure cupric oxychloride suitable for direct use in the production of cuprammonium cellulose spinning solution which comprises converting the cement copper into a mixture of cuprous chloride and cement copper by reaction thereon with a reactive chlorine compound, treating the mixture with aqueous sodium chloride solution whereby to dissolve cuprous chloride from the former, separating the solution containing cuprous chloride from undissolved matter, oxidizing the separated cuprous chloride solution whereby to convert the cuprous chloride content into insoluble, substantially chemically pure, cupric oxychloride and soluble cupric chloride, separating the cupric oxychloride from the resulting mother liquor containing cupric chloride, and using the latter as the reactive chlorine compound for converting additional cement copper in a repetition of the process.

ERNST KUSS.
OSKAR EMERT.
ANDREAS HAKE.

CERTIFICATE OF CORRECTION.

Patent No. 2,162,176.  June 13, 1939.

ERNST KUSS, ET AL.

It is hereby certified that error appears in the printed specification of the above numbered patent requiring correction as follows: Page 2, first column, line 60, for the word "liter" read per liter; page 3, second column, line 1, claim 6, strike out the words "copper, treating the mixture of cuprous chloride" and insert the same before "and" in line 1, first column of page 3, claim 1; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)